Figure 1:
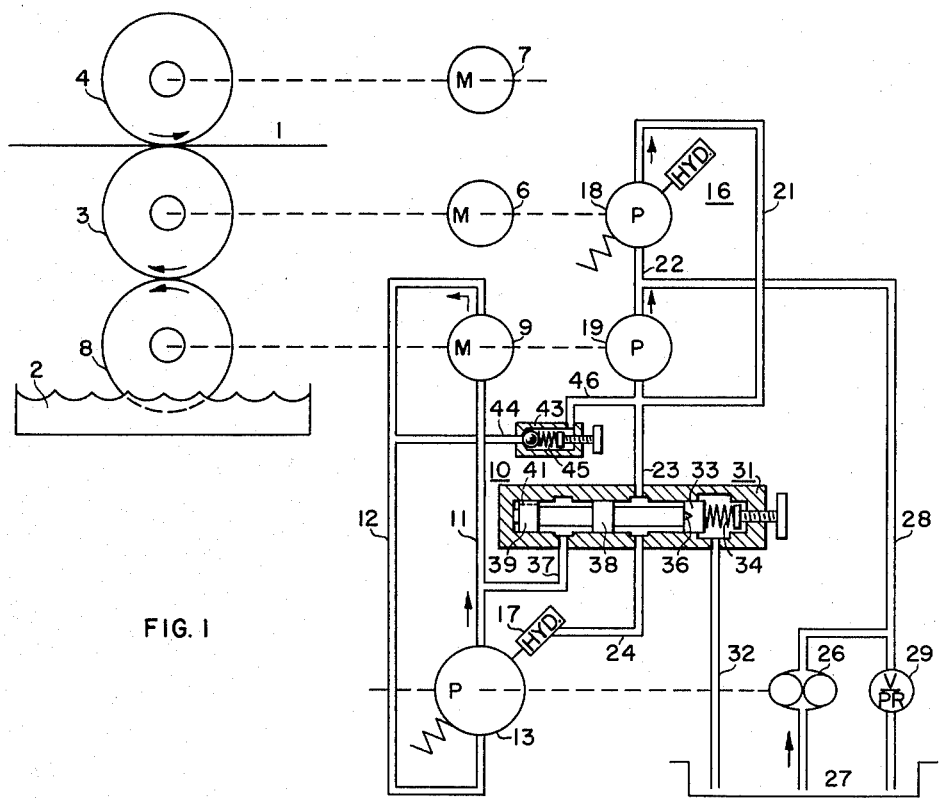

May 12, 1964  R. TYLER  3,132,487

HYDRAULIC TRANSMISSION WITH LOAD LIMITING SPEED CONTROL

Filed Feb. 26, 1962

*RANSOM TYLER*
INVENTOR

ATTORNEY 3,132,487
HYDRAULIC TRANSMISSION WITH LOAD
LIMITING SPEED CONTROL
Ransom Tyler, Milwaukee, Wis., assignor to The
Oilgear Company, Milwaukee, Wis.
Filed Feb. 26, 1962, Ser. No. 175,887
6 Claims. (Cl. 60—53)

This invention relates to a hydraulic transmission in which the speed of a rotary hydraulic motor is maintained as a constant ratio with the speed of a reference device, and relates more particularly to such a transmission having means to vary a signal calling for change in speed so as to limit the torque applied by the hydraulic motor.

In a hydraulic drive system in which the speed of one hydraulic motor is normally maintained at a constant ratio with respect to the speed of another hydraulic motor and the driven load devices of the two motors cooperate and are subject to varying degrees of frictional coupling, excessive brake torque occurs as such frictional coupling increases; and this excessive torque is avoided, according to the present invention, by control means reducing the difference of such speeds and thereby reducing the frictional drag between the load devices.

The invention is particularly applicable, for example, to a paper coating system comprising a pickup cylinder that wipes a viscous coating material on an abutting coating cylinder. The coating cylinder is driven at a constant speed by a relatively high powered motor, and the pickup cylinder is driven at a slightly greater speed by a relatively low powered hydraulic motor. It happens that a characteristic of the coating material may undergo change causing the coefficient of friction between the coating cylinder and the pickup cylinder to rise to an extent that the coating cylinder acts as a brake on the pickup cylinder so that it can no longer slip on the coating cylinder and can only rotate at the same surface speed as the coating cylinder. The speed control for the hydraulic motor driving the pickup cylinder normally tries to overcome the braking action and the torque demanded thereby becomes excessive, resulting in a pressure relief valve suddenly blowing to protect the drive. Such excessive torque may prove damaging to gearing coupling the hydraulic motor to the pickup cylinder. In accordance with the present invention, however, the speed command signal for restoring the speed of the hydraulic motor driving the pickup cylinder is reduced in accordance with the increase in the braking effect or the load on the pickup cylinder; excessive torque and unnecessary blowing of the relief valve is thereby avoided along with harmful hydraulic shocks to the system.

The invention is also applicable to a paper coating system in which the pickup cylinder is normally driven at a slightly lower surface speed than that of a coating cylinder on which it transfers viscous coating material. In this latter case when the coefficient of friction rises so that the pickup cylinder acts as brake, the high powered coating cylinder begins driving the pickup cylinder at the higher speed of the coating cylinder. The speed control for the hydraulic motor driving the pickup cylinder tries to lower its speed. In accordance with the present invention, however, the speed command signal for reducing the speed of the hydraulic motor is opposed so that the effective speed command signal is increased in accordance with the braking effort of the hydraulic motor to thereby reduce the braking torque and permit the hydraulic motor to operate at the higher speed.

It is therefore an object of the invention to provide a hydraulic transmission having a speed control system with means to vary the speed of a hydraulic motor thereof in accordance with an increase in the torque load above a predetermined value.

Another object of the invention is to provide a hydraulic speed control system for one of two motors driving frictionally engaged load devices so that the speed of the controlled motor limits the differential speed in accordance with the coefficient of friction between the load devices.

Another object of the invention is to provide a hydraulic speed control system for one of two motors driving frictionally engaged load devices normally operating at slightly different speeds, with means modifying the speed control so that the controlled device operates at the same speed as the other when the coefficient of friction therebetween rises so as to frictionally couple both the load devices.

Figure 2:
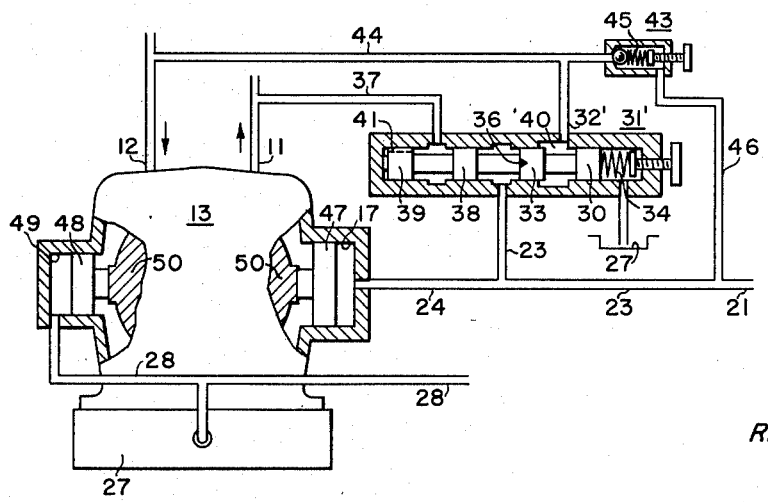

Other objects and advantages will be apparent to one skilled in the art from the following description and accompanying drawings, in which:

FIG. 1 is a schematic circuit for a hydraulic transmission including a variable displacement hydraulic pump embodying the invention; and FIG. 2 is a modification of the schematic circuit of FIG. 1 and also shows the stroke control cylinders of the pump in cross section.

Referring to the drawing, a hydraulic transmission embodying the invention is shown in FIG. 1 in connection with a paper coating system. In the paper coating system a web of paper is drawn between a pair of web driving cylinders 3 and 4 driven through gearing, not shown, by suitable motor means such as hydraulic motors 6 and 7. Cylinder 3 is the coating cylinder that is adapted to roll viscous material 2 to the undersurface of the web of paper 1.

The viscous material 2 is wiped on to the coating cylinder 3 by a pickup cylinder 8 that revolves partially immersed in a bath of the viscous material 2. The adjacent surfaces of the cylinders move in the same direction, as indicated by the arrows on the cylinders, and the pickup cylinder 8 normally has a different surface speed from that of the coating cylinder to provide the wiping action.

The torque requirements for the coating cylinder are very large relative to the torque requirements normally required for the pickup cylinder. The hydraulic transmission 10 for the pickup cylinder therefore comprises a relatively low torque hydraulic motor 9.

Hydraulic motor 9 may be a variable displacement type but preferably is a fixed displacement type of motor supplied with motive fluid by a variable displacement hydraulic pump 13 whose displacement is controlled to regulate the speed of the hydraulic motor 9.

Pump discharge, indicated by the arrow direction, is supplied to the hydraulic motor 9 by a transmission line 11, and motor discharge and pump return is connected by a transmission line 12. A suitable high pressure relief valve, not shown, limits the pump discharge pressure to a predetermined maximum value. Pump inlet, represented by line 12, is surcharged with fluid from a reservoir 27, in a known manner, by an auxiliary pump such as gear pump 26 which also surcharges channel 22 of a speed control hydraulic circuit 16.

The speed control hydraulic circuit is a hydraulic differential comprising a reference flow of fluid supplied by a pilot pump 18 driven at a constant speed by the hydraulic motor 6 which drives the constant speed coating cylinder. The other flow providing means of the hydraulic differential is a pilot pump 19 driven by hydraulic motor 9. Pilot pump 13 has a variable displacement member for providing a selected flow at its operating or reference speed. A channel 21 connects the outlet of pilot pump 18 to the inlet of pilot pump 19; and a channel 22 connects the outlet of pilot pump 19 to the inlet of pilot pump 18, whereby the pilot pumps are connected in a closed loop series circuit. Each pilot pump absorbs the output of the other pilot pump, more or less, dependent on the speed of pilot pump 19, and dependent therefore on the speed of motor 9 and pickup cylinder 8. Channel 21 is connected by channels 23, 24 to a stroke control cylinder 17 for pump 13. The arrangement is such that at the desired motor speed the hydraulic differential produces a pressure in channel 21 sufficient to position the displacement member for pump 13 so that its fluid output motivates the hydraulic motor 9 at the desired speed.

On variations from such desired speed for hydraulic motor 9, the displacement member for pump 13 is displaced in a direction from a neutral position such that fluid flow into control cylinder 17 from the hydraulic differential circuit 16 causes the stroke of the pump to increase, and, contra, fluid flow from cylinder 17 causes the stroke to decrease.

For regulation of the stroke of pump 13, the stroke control cylinder 17 comprises a stroke control piston 47 that tends to move the pump displacement member 50 in opposition to the force of a bias piston 48 in a cylinder 49 supplied with fluid at a constant pressure from gear pump 26. The gear pump 26 may be included in the same casing from pump 13 and reservoir 27 may be made integral therewith or as part of a base therefor, as illustrated in FIG. 2. The gear pump 26 draws liquid from reservoir 27 and its output is connected by a channel 28 that supplies pressure fluid to pump bias cylinder 49 and supplies make up fluid to channel 22 of the hydraulic differential circuit 16. A gear pump relief valve 29 operatively connects gear pump channel 28 to reservoir 27 to limit gear pump discharge pressure to a predetermined relatively low value, such as 75 p.s.i.

The frictional coupling between the motor 9 and the motor 6 increases when the coefficient of friction increases between the cylinders 3 and 8 and thereby increases the braking torque therebetween and causes a sudden rise in pressure in one of the transmission lines 11, 12. Means limiting such braking torque and line pressure comprises line pressure responsive means for overriding the speed control command to the hydraulic pump. Such limiting means comprises a first valve 31 responsive to a predetermined high pressure in line 11 and a second valve 43 responsive to a predetermined high pressure in line 12.

Valve 31 is a spool type sequence valve having a first port connected by a channel 37 to pump discharge line 11. Valve 31 has a second port connected by a channel 23 to the pressure signal channel 21 of the hydraulic differential 16. Valve 31 has a third port connected by a fluid return line 32 which preferably is connected to reservoir 27. The valve spool comprises spaced lands 33, 38, 39 disposed on opposite sides of the first and second ports, with the spool urged in one direction by an adjustable compression spring 34 and urged in the opposite direction by pressure from channel 37 admitted through a flow rate limiting slot 41 in the end land 39 to the end of the valve spool. Land 33 normally blocks communication between channel 23 and return channel 32. Land 33, however, has a throttle or bleed slot 36 that is formed by a 60 degree angle V-shaped slot that tapers radially into the cylindrical surface of the land. This bleed slot provides gradually increasing communication between channel 23 and fluid return channel 32 as the valve spool is displaced to the right by the pressure from line 11. The spring 34 of valve 31 is preset so that valve 31 begins to bleed fluid from cylinder 17 and from the speed control circuit at a predetermined value of pressure in line 11.

The other valve 43 is preferably a spring biased ball type check valve having an inlet connected by a channel 44 to transmission line 12 and an outlet connected by a channel 46 to channel 21 of the speed control circuit. The spring 45 of check valve 43 is preset so that the valve opens when the pressure in line 12 exceeds a predetermined value for admitting pressure fluid therefrom to the speed control circuit to over-ride the speed control pressure.

In operation, the above described closed loop speed control structure prevents excessive braking torque between two frictionally coupled, independently driven load devices, cylinders 3 and 8, which normally operate at different speeds. The system modifies the signal from a speed ratio hydraulic circuit 16 to vary the command to the pump stroke control servomotor 17. Thus, in a system where the pickup cylinder 8 normally has a faster surface speed than the coating cylinder, the coating cylinder 3 provides excessive braking torque brake on pickup cylinder 8, which slows hydraulic motor 9 and causes signal pressure to tend to rise in channel 21 of the speed control circuit, due to pilot pump 19 slowing down. This occurrence would command the pump 13 to increase its stroke. In response to the increased load on motor 9, however, line pressure immediately rises in transmission line 11 to operate valve 31 and bleed control fluid from the speed control circuit, thereby reducing the control pressure with increased pump discharge pressure and accordingly is effective to reduce the stroke of the pump 13 so as to limit the pressure in line 11. The control thus operates to permit the pickup cylinder to slow down to the speed of the coating cylinder for minimizing the braking torque therebetween.

In a system where the pickup cylinder 8 is normally operated at a slower surface speed than that of the coating cylinder 3, then increased frictional coupling therebetween due to a rise in their coefficient of friction causes the coating cylinder to drive the pickup cylinder at the higher speed. Pilot pump 19 is thus driven at a higher speed thereby reducing the pressure signal in channel 21 due to the hydraulic differential 16. Motor 9, however, being driven by its load cylinder, acts as a pump and causes the line pressure in transmission line 12 to rise; and at a predetermined value of such pressure valve 43 opens to admit pressure fluid to the speed control circuit 16 from line 12, thereby overriding the speed control and commanding the pump 13 to increase stroke to absorb the fluid output of motor 12 and thereby limit the pressure in transmission line 12. This overriding control exercised by valve 43 upon a predetermined pressure being exceeded in line 12, permits the hydraulic motor 9 to run at the higher speed and limits the braking torque between the pickup cylinder 8 and the coating cylinder 3.

Valves 31 and 43 thus define valve means responsive to pressure in either hydraulic power transmission line exceeding a predetermined value for overriding the speed control to vary the pump stroke so as to limit the line pressure and avoid the blowing of pressure relief valves for the transmission.

FIG. 2 shows the pump 13 such as is employed in the circuit of FIG. 1. In FIG. 2, however, a valve 31' is substituted for the valve 31 of FIG. 1. Valve 31' includes an additional land 30 spaced from control land 33 to define a chamber 40 therebetween whose fluid is isolated from the end of the valve spool. This chamber 40 is connected to a fluid return provided by channel 32' and channel 44 which connect to pump return line 12. Valve 31' is operable in response to fluid pressure in line 11 exceeding a predetermined value for displacing the valve spool and bleeding control fluid from cylinder 17 and from the speed control circuit, through channels 23, 24 and 21, and discharging such fluid into valve chamber 40 connected to fluid return line 12.

When the pressure in line 11 does not exceed the preset value for valve 31', valve 31' is not operative, and high pressure in line 12 has no effect on valve 31'.

Valve 31' and valve 43 provide valve means operatively connecting the speed control circuit to a discharge port of the hydraulic motor 9, which is line 12 and the inlet for the pump 13, in response to line pressure in lines 11 or 12 respectively, exceeding the predetermined value as preset for the springs 34, 45 of valves 31' and 43. The valve means thus varies the control pressure in the speed control circuit in opposition to that provided by the metering pumps 18, 19, and easily overrides the speed control to command the pump stroke so as to limit the line pressure to the predetermined value.

While essentially but one embodiment of the invention has been shown and described, various changes and modifications may be made therein within the spirit of the invention and the scope of the appended claims.

I claim:

1. In a closed loop speed control system for a hydraulic transmission adapted to drive a first machine at a speed greater than the speed of an independently driven second machine which frictionally engages the first machine with a relatively low coefficient of friction therebetween, and including hydraulic control means responsive to the speed ratio of the first and second machine for controlling the speed of the first machine, in combination therewith, a bleed valve operatively connected to said hydraulic control means for reducing the speed of the first machine in response to increased loading thereof.

2. In combination with a variable displacement pump supplying motive fluid to a hydraulic motor, of hydraulic servo means including a control cylinder receiving a fluid under pressure for varying pump displacement in accordance with the difference in the speed of said motor and the speed of a reference motor, and a valve connected between said control cylinder and an exhaust and operable in response to discharge pressure of said pump exceeding a predetermined value for exhausting fluid from said control cylinder in accordance with said pump discharge pressure, thereby reducing the speed of said hydraulic motor.

3. In combination with a variable displacement pump supplying motive fluid to a hydraulic motor, and hydraulic servo control means for varying the stroke of the pump in accordance with the fluid pressure existing in a hydraulic differential speed control circuit including a first pilot pump driven by the hydraulic motor and hydraulically connected in series with a second pilot pump driven by a reference machine, a valve operatively connecting the speed control circuit to a fluid return, said valve including means responsive to pressures above a predetermined valve of motive fluid supplied to said hydraulic motor for bleeding fluid from said speed control circuit and accordingly reducing the speed of said hydraulic motor.

4. In a paper coating drive system in which a coating cylinder is driven at a given surface speed and a pickup cylinder is adapted to wipe coating material on to the coating cylinder and is driven at a higher surface speed by a hydraulic transmission, the hydraulic transmission comprising a variable displacement hydraulic pump that supplies motive fluid to a hydraulic motor driving said pickup cylinder at a speed varying in accordance with the fluid pressure existing in a hydraulic differential speed control circuit, the speed control circuit comprising two metering pumps hydraulically connected in series and coupled, respectively for rotation with the coating cylinder and the pickup cylinder, and in combination therewith, a bleed valve operatively connecting said speed control circuit to a return so as to reduce the pressure in the speed control circuit in response to the pressure of the motive fluid supplied to said hydraulic motor exceeding a predetermined value to thereby reduce the speed of the pickup cylinder.

5. In a closed loop speed control system for a hydraulic transmission adapted to drive a first load device at a predetermined speed ratio of the speed of an independently driven second load device wherein said load devices have moving surfaces that slide one on the other in accordance with said speed ratio when the coefficient of friction therebetween is relatively low, said hydraulic transmission comprising a hydraulic motor driving the first load device, a variable displacement pump supplying motive fluid to said hydraulic motor, a hydraulic differential speed control circuit comprising two metering pumps hydraulically connected in series and mechanically coupled, respectively, for rotation with the load devices, said speed control circuit providing a control pressure for controlling the stroke of the variable displacement pump for maintaining said speed ratio, and valve means operatively connecting said speed control circuit to a discharge port of said hydraulic motor in response to fluid pressure at either the inlet or outlet port of the hydraulic motor exceeding a predetermined value for varying the control pressure in the speed control circuit in opposition to that provided by said metering pumps, thereby limiting the braking torque between said load devices.

6. In combination with a variable displacement pump supplying motive fluid to a hydraulic motor that normally drives a load device at lower surface speed than a surface speed of an independently driven load device frictionally coupled therewith, hydraulic servo means including a control cylinder for varying pump displacement in accordance with variations in the ratio of said surface speeds of said load devices so that upon excessive speed of said motor due to frictional coupling of said load devices said hydraulic servo means normally responds to reduce the stroke of the pump, and a valve operatively connecting the discharge of said hydraulic motor to said control cylinder only when the pressure of fluid discharged by said motor exceeds a predetermined pressure to cause said control cylinder to increase the stroke of the pump so as to permit said motor to run at a higher speed corresponding to the surface speed of the independently driven load device and to thereby limit the braking torque of said motor.

References Cited in the file of this patent

UNITED STATES PATENTS

| | | |
|---|---|---|
| 2,177,097 | Doe et al. | Oct. 24, 1939 |
| 2,600,632 | French | June 17, 1952 |
| 2,603,065 | Sarto | July 15, 1952 |